Figure 3:
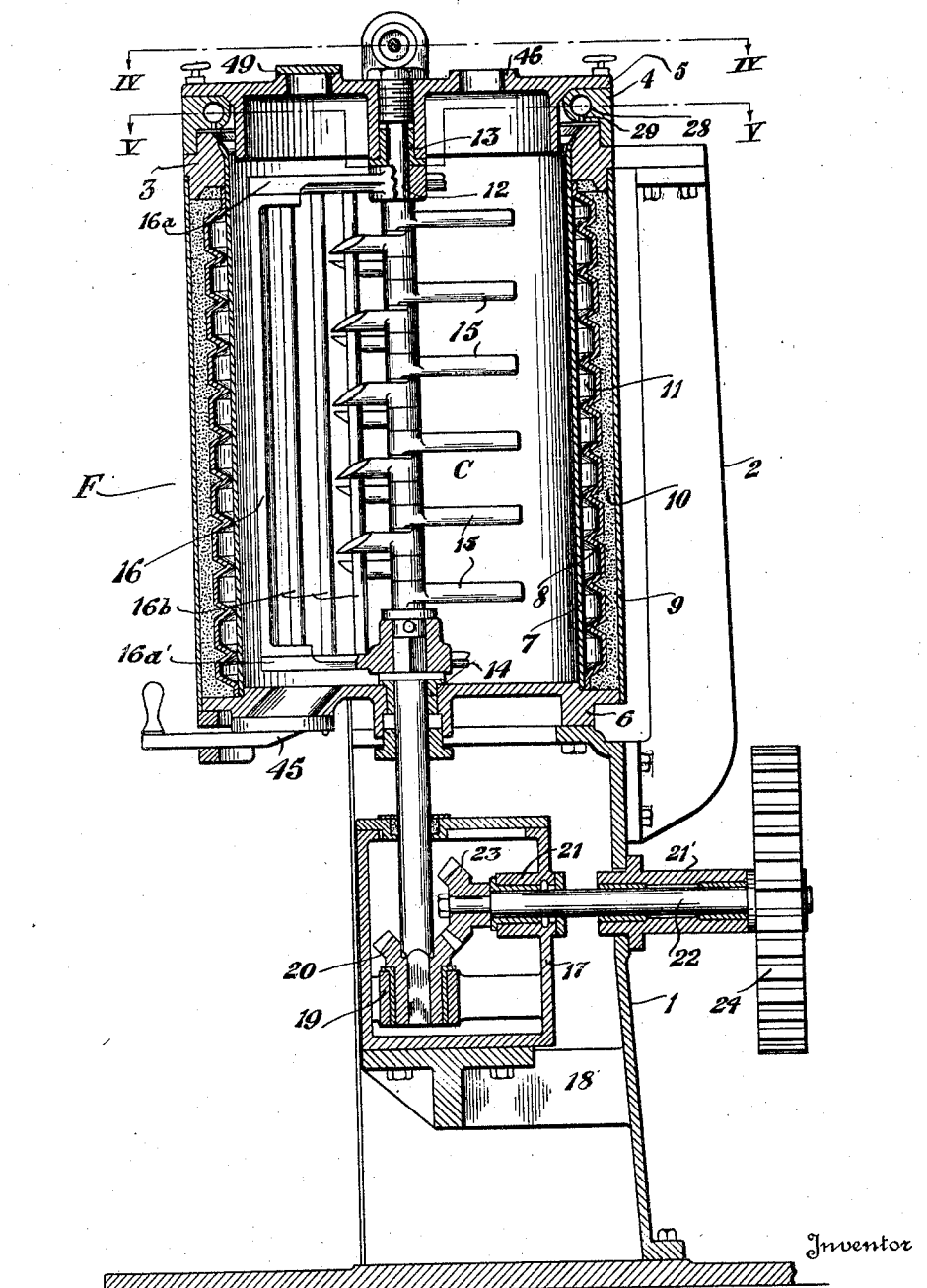

April 14, 1925.
L. S. PFOUTS
ICE CREAM FREEZER
Filed Sept. 23, 1924
1,533,708
3 Sheets-Sheet 1
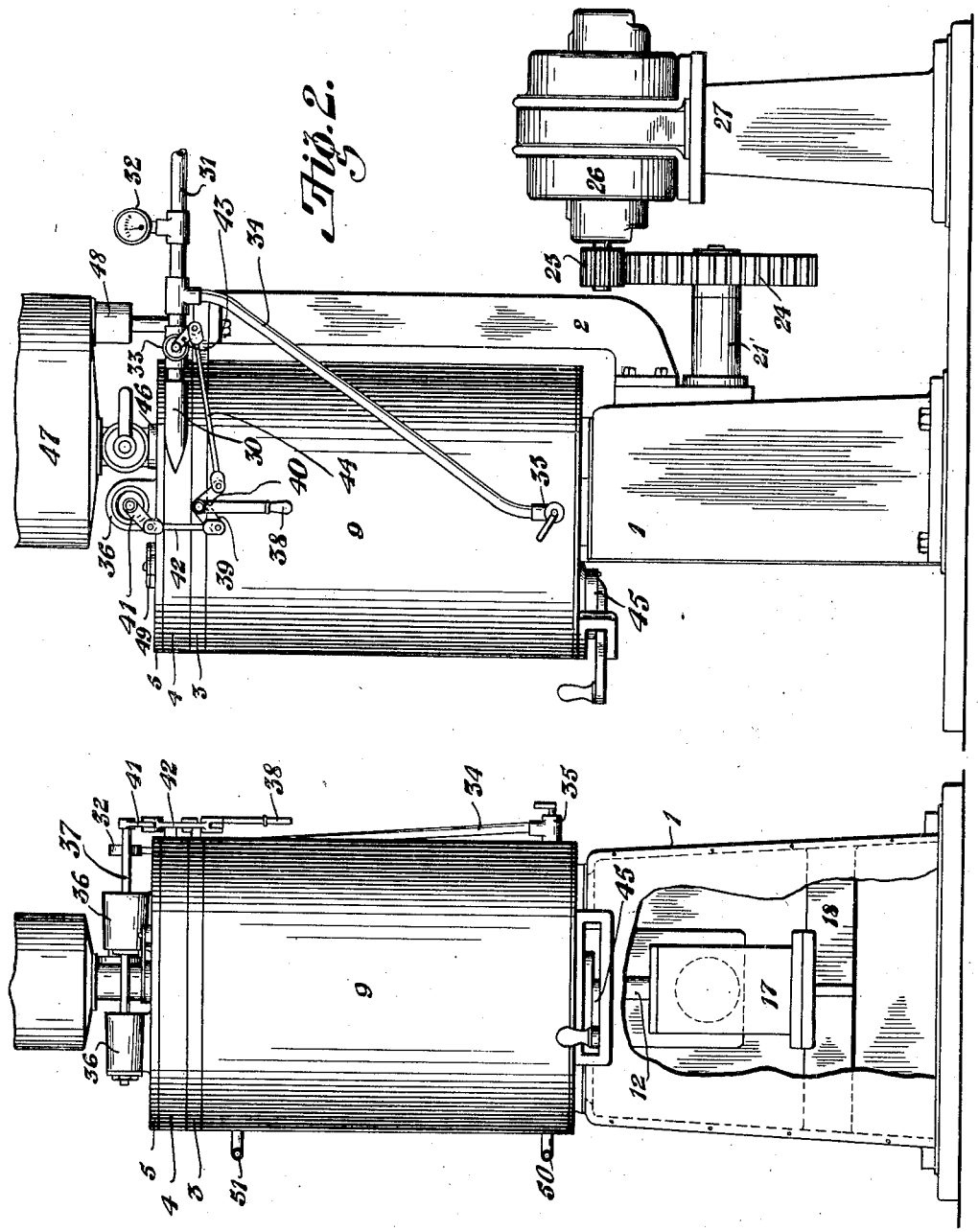
Inventor
Leroy S. Pfouts.
By Frease and Bond
Attorney April 14, 1925.
L. S. PFOUTS
ICE CREAM FREEZER
Filed Sept. 23, 1924    3 Sheets-Sheet 2

1,533,708

Inventor
Leroy S. Pfouts.
By Frease and Bond
Attorneys

April 14, 1925.  
L. S. PFOUTS  
ICE CREAM FREEZER  
Filed Sept. 23, 1924  3 Sheets-Sheet 3  
1,533,708

Inventor  
Leroy S. Pfouts.  
By Frease and Bond  
Attorneys

Patented Apr. 14, 1925.

1,533,708

UNITED STATES PATENT OFFICE.

LEROY S. PFOUTS, OF CANTON, OHIO.

ICE-CREAM FREEZER.

Application filed September 23, 1924. Serial No. 739,310.

*To all whom it may concern:*

Be it known that I, LEROY S. PFOUTS, a citizen of the United States, residing at Canton, in the county of Stark and State of Ohio, have invented new and useful Improvements in Ice-Cream Freezers, of which the following is a specification.

The invention relates to freezers for making ice cream and like products wherein a sterile inert gas is incorporated with the ice cream for the purpose of displacing the impure air which would otherwise constitute a large proportion of the ice cream and would be a dangerous deteriorating ingredient unless displaced by the inert gas.

Sterile gas bearing ice cream has been made by partially filling a freezer chamber with the liquid ingredients of the ice cream, then inserting a gas tube into the chamber and forcing gas therein to displace the air in the mixture and in the chamber. The tube is then withdrawn and the freezer mechanism operated.

It has been found difficult accurately to judge the amount of gas necessary to force into the chamber, and if, after the freezing operation has commenced, it is desired to introduce more gas, it is necessary to stop the freezing mechanism, and reinsert the tube. It has moreover been found that the air remaining in the chamber after it has been partially filled with the liquid ingredients will mix with the incoming gas so that it is practically impossible to make ice cream in which all the voids are filled with a sterile inert gas.

The objects of the present invention are to provide a freezer in which all the air in the freezer chamber is preferably displaced by a sterile inert gas before the liquid ingredients are introduced, and in which there are co-ordinated valve means incorporated in the freezer for admitting the original gas, and for admitting more gas if desired after the freezing operation has been started without necessitating the stopping of the freezer mechanism.

A further object of the invention is to provide a plurality of circumferentially spaced inlet ports for the gas, in order to avoid a tendency of the gas to localize when it is injected into the chamber from the end of a single tube.

Another object of the invention is to insure the thorough mixing of the inert gas and subsequently introduced liquid ingredients, and to improve the smoothness and quality of the ice cream, by providing a freezing mechanism including scrapers, spirally arranged lifting blades, and whipping rods which constantly lift the freezing mixture from the bottom of the freezer chamber and agitates it in contact with the inert gas for filling the voids of the ice cream with the gas as it is frozen.

The invention is illustrated in the accompanying drawings forming a part hereof, in which—

Figure 4:
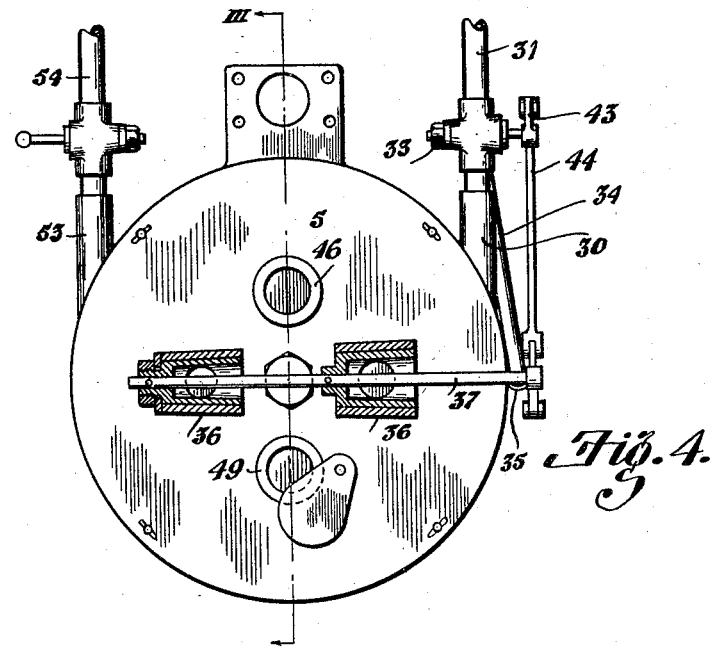
Figure 5:
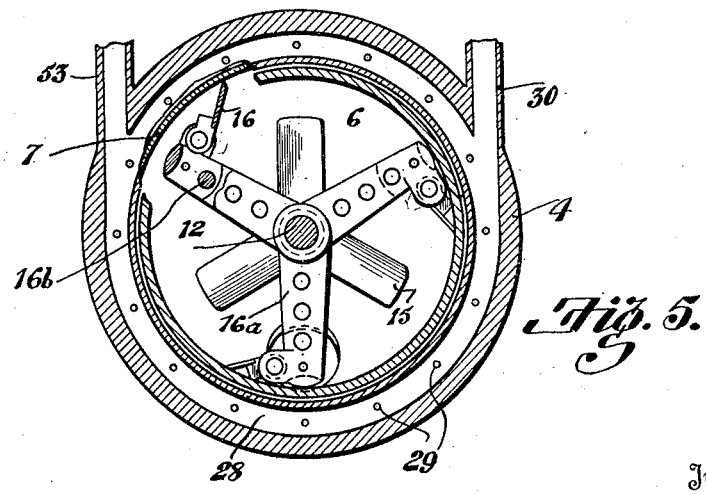

Figure 1 is a front elevation of the improved ice cream freezer;

Fig. 2, a side elevation of the same showing the motor drive;

Fig. 3, a longitudinal cross-section of the same, as on line III—III, Fig. 4;

Fig. 4, a top plan view of the same showing the air valves in longitudinal cross-section as on line IV—IV, Fig. 3; and Fig. 5, a transverse cross-section of the same, as on line V—V, Fig. 3.

Similar numerals refer to similar parts throughout the drawings.

The improved freezer indicated at F, includes a base 1 upon which is mounted a vertical supporting column 2 carrying at its upper end a mounting ring 3.

A gas inlet channel ring 4, and an air valve and blade and scraper drive shaft upper bearing head 5 are seated upon the mounting ring as shown, while a discharge gate and blade and scraper drive shaft lower bearing head 6 is spaced below the ring 3, and mounted on the base 1.

Between the ring 3 and head 6 are fitted and mounted as shown an inner freezer cylinder 7, a corrugated cylindrical freezing mixture helix former 8, and an outer cylinder 9; thus forming a case having a freezing chamber C therein.

A cork insulation 10 fills the space between the outer cylinder 9 and the helix former 8, and the helix former and the cylinder 7 provide a freezing mixture helix whose successive cross sections are indicated by 11.

A blade and scraper drive shaft 12 is centrally located in the freezer and journalled in upper bearing 13 in the air head 5, and in lower bearing 14 in the discharge head 6. In the freezer and mounted upon the drive shaft 12, radially and vertically spaced blades 15 and spaced scrapers 16 are provided.

The radial and vertical spacing of the blades 15 about the shaft is such that the tips of the blades describe a spiral curve, and the angle of incidence of the blades is such that their rotation in the proper direction causes a progressive lifting of any material in the freezer chamber.

The scrapers 16 are attached to the shaft 12 by means of pairs of radial arms $16^a$ and $16^{a'}$ located at each end of the shaft in the freezer chamber. Between each pair of arms $16^a$ and $16^{a'}$ there is also provided a plurality of whipping rods $16^b$.

A drive gear case 17 is mounted on the base 1 by means of gear case bracket 18. A thrust bearing 19 is secured in the case for carrying the thrust load of the shaft 12 and a bevel follower gear 20 keyed to the lower end of the shaft.

In the side of the case and in the base are located and alined drive shaft bearings 21 and 21', in which drive shaft 22 is journalled. One end of the shaft extends into the gear case, where bevel drive pinion 23 is keyed upon the shaft 22 and meshes with the bevel follower gear 20. At the opposite end of the drive shaft 22, beyond the base 1, a drive gear wheel 24 is keyed, and meshes with a drive pinion 25 secured to the shaft of a drive motor 26 mounted upon a motor base 27.

In the gas inlet channel ring 4 there is formed an annular channel 28 opening into a plurality of circumferentially spaced gas inlet ports 29 which communicate directly to the interior of the freezer. A tangential tube 30 connects one side of the gas ring with the gas pipe line 31 in which is located a gas flow meter 32 and a gas control valve 33; and a by-pass 34 having a by-pass valve 35 may lead from the line 31 to the bottom of the freezer. The pipe 31 is connected to a source of gas supply, such as carbon dioxide, which is preferably under pressure. Co-axially located on the air valve head 5 are two sleeve air valves 36 carrying a common air valve shaft 37.

Conveniently located upon the side of the freezer there is provided a control lever 38 having an air valve bell crank 39, and a gas valve bell crank 40. An air valve lever 41 mounted on the outer end of air valve shaft 37 is connected to the air valve bell crank 38 by means of air valve link 42; while a gas valve lever 43 operating the gas control valve 35, is connected to the gas valve bell crank 40 by means of gas valve link 44.

A discharge gate 45 is provided in the discharge head 6, while in the air valve head an inlet orifice 46 communicates with a batch tank 47 suitably supported on the bracket 2 by means of extension 48. The air valve head is also provided with a peephole 49 for convenient inspection of the ice cream in the process of freezing, and for providing an auxiliary air or gas outlet from the freezer chamber.

Pipe 50 is the inlet to the freezing mixture helix, while pipe 51 is the outlet for the same, and are suitably connected into a line not shown, which circulates a freezing mixture such as brine through the freezing helix.

A tangential tube 53 connects the gas ring with a water supply line 54 opposite the gas tube 30, for providing an entrance for cleaning water, after the freezer has ben emptied of the finished ice cream.

In operation, the control lever 38 is first actuated to open simultaneously the gas inlet valve 33, and the air outlet valves 36. The particular arrangement of the freezer parts illustrated is adapted for the use of carbon dioxide as the sterile inert gas. Upon the opening of the gas valve 33, carbon dioxide being heavier than air, will pass through the flow meter 32, and the by-pass valve 35 being closed, into the channel 28 of the gas inlet channel ring 4, and through the circumferentially spaced gas ports 29 into the freezing chamber C.

In the chamber the admitted gas will descend down the inside of the inner cylinder 7, displacing the lighter air and forcing it out through the open air valves.

When the gas flow meter indicates that sufficient gas has been admitted to the freezing chamber, preferably enough to displace all the air in the chamber, the control lever is again actuated to close simultaneously both the gas inlet valve and the air outlet valves.

The freezing chamber now being filled with a sterile inert gas, the liquid ingredients of the ice cream may be admitted to the freezing chamber from the batch tank 47 through the inlet orifice 46. In order to attain rapid and easy filling of the tank with the required amount of liquid ingredients, the peep-hole 49 is preferably opened to permit the discharge of the gas displaced by the admitted liquids.

The circulation of brine through the helix, and the operation of the scrapers, lifting blades, and whipping rods geared to the motor, is then commenced. The arrangement of the scrapers, blades and whipping rods of the present invention is such that liquid or partially frozen ice cream never remains at rest on the bottom or sides of the freezing chamber. The scrapers 16 constantly remove the materials from the sides of the tank, while the rotation of the spirally spaced lifting blades constantly counteracts the tendency of the materials to settle to the bottom of the tank. This and the action of the whipping rods, thoroughly agitates the ice cream materials with the previously admitted carbon dioxide in the freezing tank to produce a smooth ice cream of high quality in which all the voids are filled with a sterile inert gas.

If for any purpose it is desired to admit more gas into the freezing chamber during the freezing operation, the by-pass valve 35 may be opened to admit the desired amount of gas, without stopping the operation of the scrapers, lifting blades, and whipping rods.

After freezing one batch of ice cream the batch may be removed through the discharge gate, and a new charge of inert gas may be introduced into the freezer chamber without stopping the operation of the scrapers, lifting blades and whipping rods, so that the operation of the same together with the circulation of the brine can be carried on continuously.

I claim:

1. The method of making ice cream and the like in a freezing chamber, which consists in introducing a gas into the freezing chamber to displace air therefrom, then introducing liquid ingredients into the chamber and freezing the same therein.

2. The method of making ice cream and the like in a freezing chamber, which consists in introducing a sterile inert gas into the freezing chamber to displace air therefrom, then introducing liquid ingredients into the chamber and freezing the same therein.

3. The method of making ice cream and the like in a freezing chamber, which consists in introducing carbon dioxide gas into the freezing chamber to displace air therefrom, then introducing liquid ingredients into the chamber and freezing the same therein.

4. The method of making ice cream and the like in a freezing chamber, which consists in introducing a gas into the freezing chamber to displace all of the air therefrom, then introducing liquid ingredients into the chamber and freezing the same therein.

5. The method of making ice cream and the like in a freezing chamber having agitating means therein which consists in introducing a gas into the freezing chamber to displace air therefrom, then introducing liquid ingredients into the chamber and freezing and agitating the same therein.

6. The method of making ice cream and the like in a freezing chamber having agitating means operating therein, which consists in introducing a gas into the freezing chamber to displace air therefrom and then introducing liquid ingredients into the chamber for freezing therein, all during the operation of the agitating means.

In testimony that I claim the above, I have hereunto subscribed my name.

LEROY S. PFOUTS.